Patented June 13, 1933

1,913,774

UNITED STATES PATENT OFFICE

JOSEF SEIB, OF KONSTANZ, GERMANY, ASSIGNOR, BY MESNE ASSIGNMENTS, TO THE FIRM OF DEUTSCHE GOLD UND SILBER-SCHEIDEANSTALT, VORMALS ROESSLER, OF FRANKFORT-ON-THE-MAIN, GERMANY, A CORPORATION OF GERMANY

CATALYSTS FOR THE HYDROGENATION AND DEHYDROGENATION OF ORGANIC COMPOUNDS

No Drawing. Application filed December 20, 1928, Serial No. 327,479, and in Germany February 2, 1928.

This invention relates to the catalytic hydrogenation or dehydrogenation of organic compounds.

From tests carried out and forming the basis of the present invention it has been found that in hydrogenation and dehydrogenation—as also in the case of hydrogenation under increased pressure—far better results are obtained if catalysts are used, which are derived from the solutions of salts of these heavy metals particularly of copper by causing their oxides, hydroxides or basic salts to be deposited on carriers which consists of granular, difficultly soluble substances and which are capable of effecting this precipitation, the depc.ited compounds then, if required being reduced to the metallic state. As carriers, which simultaneously act as precipitants, particular mention may be made of not readily soluble oxides hydroxides or carbonates of readily oxidizable metals of a more electropositive character for example, $MgO.ZnO,CaCO_3$.

Accordingly the subject matter of the present invention is a method of hydrogenating or dehydrogenating organic compounds which comprises the employment of a catalyst material made by applying a solution of a soluble compound of the desired catalyst to a carrier which consists of a granular, difficultly soluble substance and which itself acts as a precipitant of an oxide compound (oxide, hydroxide or basic carbonate) of the catalyst metal, that is deposited so as to form a shell on the individual grains, and, if required, reducing the precipitated compound to the catalyst metal. The term "granular substance" means one in which the individual grains have a diameter of not less than one millimeter and does not cover substances in the condition of powder or dust or in a sand-like condition.

Although some doubt still exists as to the essence of catalysts, it may nevertheless be safely assumed that the superficial form of the catalysts plays a very important part therein.

It has been proved that catalysts produced according to the present invention are particularly suited to carrying out hydrogenation and dehydrogenation, as on the one hand they considerably increase the speed of reaction and on the other hand they largely eliminate undesirable incidental reactions. Owing to the fact that during precipitation a chemical interchange takes place between the carrier and the heavy metal salts, the desired reducible compound of the metal is obtained in the upper layers of the carrier in an extremely uniform and almost molecularly divided state. Furthermore wherever the precipitation has occurred, a corrosion of the upper surface of the carrier and consequently an activation of the carrier, which intensifies the actual action of the catalyst, may be assumed. This intensification becomes particularly advantageous when carriers are used which themselves exercise a catalytic action or which act in an activating manner on the actual catalysts.

Examples

1. Over granulated magnesia of about 5 mm. size of grain was poured a 20% aqueous solution of copper-formate; after thorough stirring the resultant solid matter was separated from the excess solution, dried, and subjected to reduction at 200–250° C. in a stream of hydrogen. The copper was deposited on the magnesia grains and formed thereon a shell of a thickness of about 1 mm.

Over this catalyst crotonaldehyde vapours and excess hydrogen were conducted at about 200°. Butanol in almost theoretical yield was obtained; the small remainder was butyl aldehyde.

2. Calcined granular lime was saturated with a solution of 10 parts cupric-nitrate and 5 parts manganic nitrate in 100 parts water, and was then dried and reduced with hydrogen.

Light wood spirit oil (wood spirit oil boiling between 70° and 200° C. and having a specific gravity of 0.85 to 0.90 according to its composition) of pungent odour and dark yellow in colour together with hydrogen was passed over this catalyst at 400° C. A good yield was obtained of a water-clear, pleasant smelling liquid.

3. Granular magnesia was saturated with a 15% nickel-nitrate solution, dried and subjected to reduction with hydrogen at 300–350° C. Over this catalyst at 250° oleic acid with excess hydrogen was conducted, the oleic acid being liquid during treatment. A crystalline product, solidifying at 40° with a stearic acid content of 30–35% was obtained.

The catalysts produced according to the foregoing examples can be utilized with equal success for dehydrogenation, for example for converting ethyl alcohol into acetaldehyde, butanol into butyl aldehyde and the like.

By the term "oxide compound" used in the claims is meant an oxide, hydroxide or basic carbonate.

What I claim is:—

1. The production of catalytic material for the hydrogenation or dehydrogenation of organic compounds, comprising the step of applying a solution of a soluble compound of the desired catalyst to a catalyst carrier which is also a precipitant with respect to said compound, followed by drying the carrier with precipitate and subjecting the same to reducing conditions.

2. The method of producing catalytic material in the form of copper and a carrier therefor, comprising applying a solution containing a copper salt to a not easily soluble porous granular material which is also a precipitant with respect to the copper salt whereby a copper containing precipitate is incorporated with said carrier, removing excess solution, drying the solid matter and subjecting it to reducing conditions.

3. The method of producing catalytic material in the form of copper and a carrier therefor, comprising applying a solution containing a copper salt to caustic calcined granular magnesia whereby copper hydroxide is formed in incorporation with the magnesia, removing excess solution, drying the solid matter, and reducing the copper component to the metallic state by heat and a stream of hydrogen.

4. A new article of catalytic material comprising magnesia and precipitated copper incorporated in the surface thereof.

5. A new article of catalytic material comprising caustic calcined granular magnesia and precipitated copper adherent to each granule.

6. A new article of catalytic material comprising granular magnesia and precipitated nickel adherent to each granule.

In testimony whereof I have signed my name to this specification.

JOSEF SEIB.